(12) United States Patent
Robinson et al.

(10) Patent No.: US 9,403,357 B1
(45) Date of Patent: Aug. 2, 2016

(54) SUBSTRATE UV LIGHT RESISTANT PRINTING PROCESS

(71) Applicant: Sawgrass Technologies, Mount Pleasant, SC (US)

(72) Inventors: Philip Robinson, Isle of Palms, SC (US); Randy Seabrook, Mount Pleasant, SC (US); Timothy L. Presnell, Mount Pleasant, SC (US)

(*) Notice: Subject to any disclaimer, the term of this patent is extended or adjusted under 35 U.S.C. 154(b) by 0 days.

(21) Appl. No.: 15/003,836

(22) Filed: Jan. 22, 2016

Related U.S. Application Data

(63) Continuation of application No. 14/748,502, filed on Jun. 24, 2015.

(60) Provisional application No. 62/016,340, filed on Jun. 24, 2014.

(51) Int. Cl.
| | | |
|---|---|---|
| *B41J 2/01* | (2006.01) | |
| *B41F 16/00* | (2006.01) | |
| *C09D 5/32* | (2006.01) | |
| *C09D 11/03* | (2014.01) | |

(52) U.S. Cl.
CPC . *B41F 16/00* (2013.01); *C09D 5/32* (2013.01); *C09D 11/03* (2013.01)

(58) Field of Classification Search
CPC ........ B41J 2/442; B41J 2/01; B41J 2002/012; B41J 11/00; B41J 11/0005; B41J 11/002; B41J 11/0075; B41J 11/48; B41M 5/0502; B41M 5/504; B41M 5/506; B41M 7/00; B41M 7/0009; B41M 7/0018; B41M 7/02; A63F 2003/066
See application file for complete search history.

(56) References Cited

U.S. PATENT DOCUMENTS

| | | | |
|---|---|---|---|
| 5,156,938 A * | 10/1992 | Foley | ........... B41M 5/24 347/171 |
| 5,851,720 A | 12/1998 | Shinohara | |
| 6,152,038 A | 11/2000 | Wagner et al. | |
| 6,312,122 B1 * | 11/2001 | Brown | ........... B41J 2/01 347/101 |
| 6,644,802 B2 | 11/2003 | Minowa | |
| 6,876,374 B2 | 4/2005 | Miyazaki | |
| 7,399,131 B2 | 7/2008 | Klinefelter et al. | |
| 8,017,297 B1 | 9/2011 | Davis | |

* cited by examiner

*Primary Examiner* — Kristal Feggins
(74) *Attorney, Agent, or Firm* — B. Craig Killough; Barnwell Whaley; Patterson & Helms

(57) ABSTRACT

An ultraviolet (UV) radiation resistance enhanced printing process uses a thermally migratable ultraviolet radiation absorber applied to a substrate to form a surface protection layer for images within the substrate. A hydrophobic thermally migratable ultraviolet radiation absorber may be applied to a transfer media prior to image transfer or as part of imaging the substrate. The application of the radiation absorber to the transfer media may be delivered digitally, either by inks comprising both sublimable colorants and the radiation absorber, or by inks comprising the radiation absorber.

12 Claims, 3 Drawing Sheets

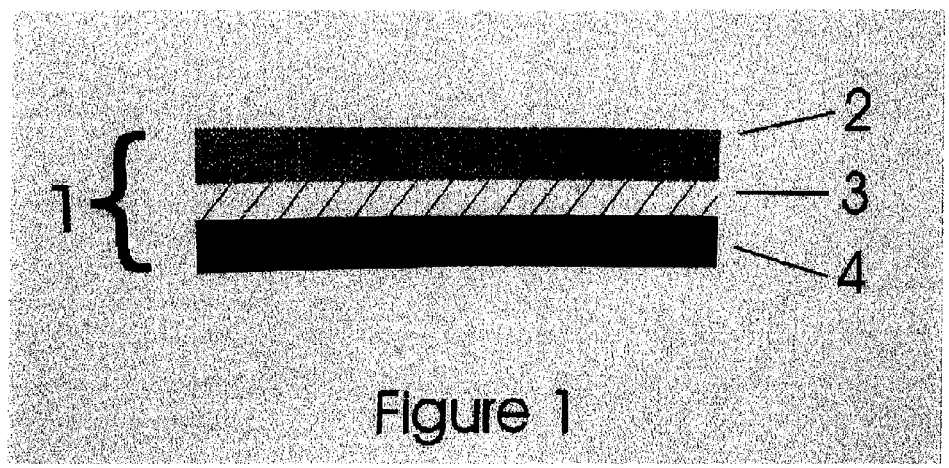
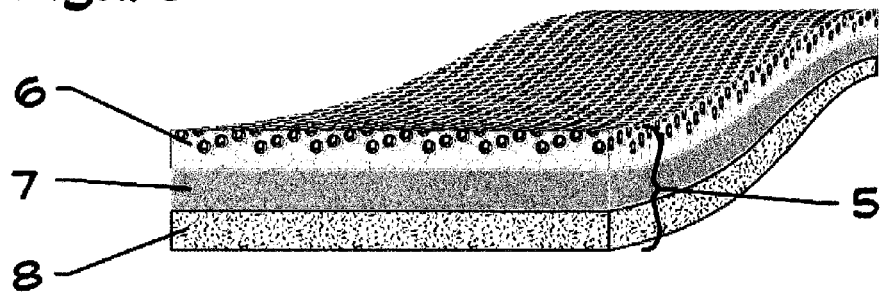

Figure 3A
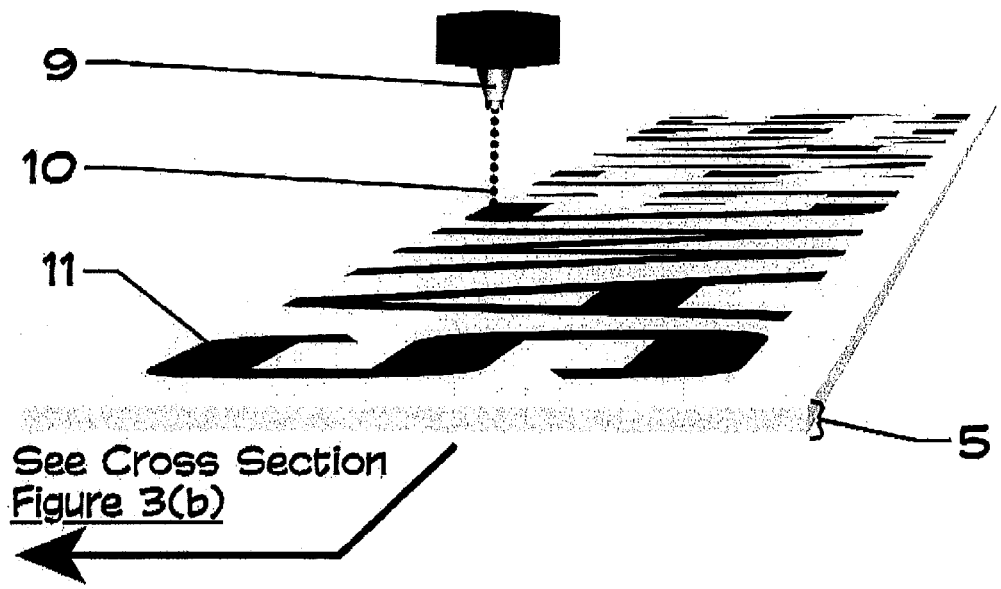
See Cross Section
Figure 3(b)
Figure 3B
Cross Section Through Printed
Image & Upper Paper Layer
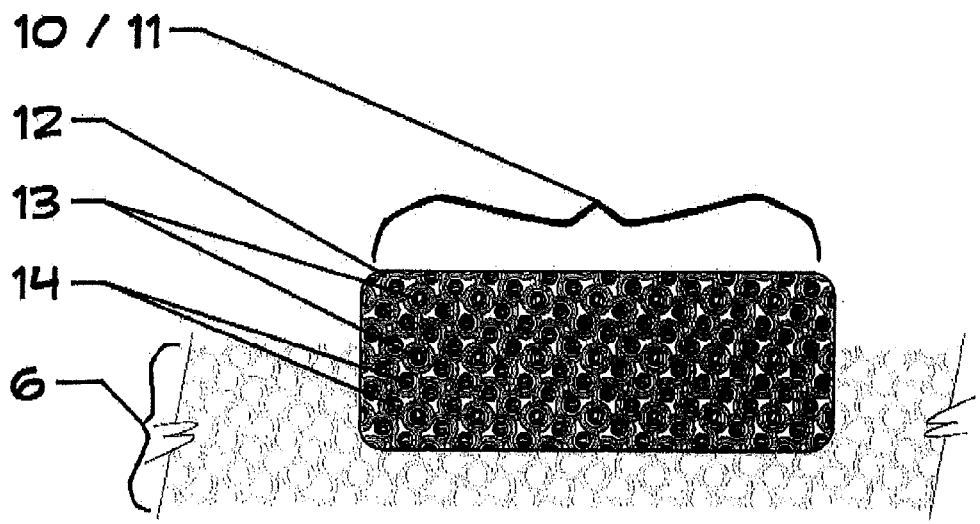

SUBSTRATE UV LIGHT RESISTANT PRINTING PROCESS

This application is a continuation of application Ser. No. 14/748,502, filed Jun. 24, 2015 which claims the benefit of U.S. Provisional Application No. 62/016,340, filed Jun. 24, 2014.

FIELD OF THE INVENTION

This invention relates to digital printing generally and is more specifically related to methods and materials for protection of digitally printed and/or transferred images.

BACKGROUND OF THE INVENTION

In recent years sublimation transfer printing, especially aqueous inkjet sublimation transfer printing, has grown substantially because of its cost-effectiveness, its ability to easily allow mass customization of substrates and its eco-friendly nature. The fast development of inkjet technology has contributed to the growth of sublimation inkjet printing. Sublimation transfer printing is widely used for synthetic polymeric materials such as polyester, polyurethane and the like because of the affinity between the sublimation colorant and the polymer. This feature enables the broad imaging application in synthetic textile/fabric imaging, and decoration of various surfaces comprising synthetic polymer materials.

Transfer printing processes involve physically transferring a printed image from one substrate to another, which is accomplished in some embodiments by the application of heat and pressure to one or both substrates. In the case of sublimation heat transfer printing, sublimation colorant molecules are embedded in the substrate material, often a polymer matrix, to form color or monochromatic images. The process is accomplished by heating colorants to gasification temperature, usually under pressure, and transferring the gasified colorant molecules from a transfer media to a final substrate, wherein the molecules either sublimate or migrate into the polymer matrix through the surface of the polymeric material for which the colorants have an affinity.

The very nature of the process of creating sublimation printing images means that at least some of the colorant molecules are present on the surface of the polymer material of the substrate, where they are exposed to a harsh environment, leading to discoloration. Chemicals such as oxygen, peroxide, and solvents/grease, and mechanical forces, heat and/or other energy sources, such as radiation, etc., are among the common factors that may be detrimental to preservation of the image/colorant at the surface of the substrate. If there are no other thermally migratable ingredients in the matrix, the sublimation colorants will continue to migrate according to the concentration gradient until they are exhausted or substantially exhausted.

Attempts have been made to protect the polymer coating and to extend the life of polymer coatings from weathering where both thermal and radiation damage contribute to colorant and image depreciation. Chemicals are used as additives to enhance weather-resistance. However, these chemicals are designed and are used to primarily protect the coating material, i.e. polymer coating materials, and/or the structure underneath the polymer coating material. Mechanical strength and integrity are of foremost importance for outdoor applications, such as construction materials, equipment, furniture and/or appliances, to reduce of elimination harmful effects from exposure to mechanical, radiation or chemical depreciation.

There is a need for improved protection of images formed by sublimation colorants and residing within a substrate polymer matrix from the effects of thermal and radiation damage. Even though coatings with various additives have been used for sublimation printing, previously known and used additives are not tailored to specifically protect sublimation colorants due to the lack of understanding sublimation imaging processes, and the physical or chemical properties of these colorants inside the coating and the surface of the coating. For example, conventional coating additives decompose at high temperatures during heat transfer of sublimation colorants, which may occur at temperatures exceeding 200° C. Chemicals used in coatings may harm the quality of the color image or the longevity of image. Colored additives or non-transparent radiation blocking agents may substantially and negatively impact image quality, largely due to the transparent/translucent nature of sublimation colorants. Monomers, oligomers, solvent residues, or chemicals with catalytic properties may result in accelerated oxidation or reduction reaction of sublimation colorant molecule chromophores. Further, additives that are deeply embedded in the coating layers do not contribute to protection of these colorants, especially protection from radiation.

Digital imaging, such as inkjet printing, has intrinsic benefits. In addition to economic benefits, digital printing provides a larger selection of colors, increased color space, higher image acuity and precision and finer detail. On-demand ink droplets are delivered in very minute and accurate discharges in required areas. Inkjet printing is especially useful for delivery of liquid phase chemicals or ingredients in required sequences to create either physical coverage/insertion, or chemical reactions on a micro-scale, which eventually leads to enhanced quality of the finished product. However, these techniques have not been fully utilized for enhancing sublimation image quality, especially in the area of radiation resistance.

SUMMARY OF THE INVENTION

The present invention relates to a polymeric surface coating having at least one hydrophobic thermally migratable ultra-violet radiation absorber (HTMUVA) in its polymeric matrix that is suitable for sublimation colorant reception. The selected polymeric coating has an affinity to both sublimation colorants and hydrophobic thermally migratable ultra-violet radiation absorbers (HTMUVA).

The polymeric surface coated substrate may have multiple layers and is preferred to be capable of sustaining required heat transfer printing conditions. At the outermost coating layers, at least one type of hydrophobic thermally migratable ultra-violet radiation absorber (HTMUVA) is physically entrapped, through a manufacturing process, inside the polymer matrix. Such HTMUVA molecules migrate gradually to the surface of the coating during the life of the object, providing a continuous protection layer for the coating and the sublimation image within.

In another embodiment of the present invention, an imprintable media, or transfer media, comprising a base substrate, an optional release layer, and an ink receiving layer, with or without a hydrophobic thermally migratable ultra-violet radiation absorber (HTMUVA) ingredient at the ink receiving layer, is used. The ink receiving layer is capable of receiving liquid sublimation inks and/or inks comprising hydrophobic thermally migratable ultra-violet radiation absorber (HTMUVA) without forming a permanent bond with the inks, and is suitable for transfer of both sublimation images and a hydrophobic thermally migratable ultra-violet radiation absorber (HTMUVA) to a final substrate.

In yet another embodiment, the present invention provides digital inkjet printable aqueous conditioning ink comprising a hydrophobic thermally migratable ultra-violet radiation absorber (HTMUVA), either in a dispersed or in an encapsulated hydrophilic form. The ink is printed using common inkjet methods, for instance, piezoelectric on-demand inkjet printing, producing a latent, or essentially colorless, image at the area where an image formed of sublimation inks is to be created on the heat transfer media. Sublimation ink may be printed to form an image on the same heat transfer media, either before or after the printing of inks comprising a hydrophobic thermally migratable ultra-violet radiation absorber (HTMUVA). Heat transfer of these materials is performed after both are printed onto the radiation resistance enhanced coating substrate, resulting in the final finished product.

Optionally, a hydrophobic thermally migratable ultra-violet radiation absorber (HTMUVA) may be used in the sublimation inkjet inks and printed simultaneously with the sublimation colorants to digitally produce an image. The hydrophobic thermally migratable ultra-violet radiation absorber (HTMUVA) may be dispersed together with sublimation colorants through a pulverizing process, or introduced as an encapsulated hydrophilic suspension additive. Intermediate media or transfer media jetted with both ingredients then undergoes a heat transfer process, creating a color, and radiation protected, enhanced image on the final, imaged substrate.

DESCRIPTION OF THE DRAWINGS

FIG. 1 shows a cross-section of a multiple layer structure of polymeric coated substrate with a hydrophobic thermally migratable ultra-violet radiation absorber (HTMUVA).

FIG. 2 illustrates an intermediate media or heat transfer media with its ink receiving layer comprising a hydrophobic thermally migratable ultra-violet radiation absorber (HTMUVA).

FIG. 3A demonstrates an intermediate media or heat transfer media receiving a sublimation ink that also comprises a hydrophobic thermally migratable ultra-violet radiation absorber (HTMUVA), creating an image that contains both ingredients FIG. 3B shows a cross section of the substrate after printing, demonstrating a printed image and upper layer of the substrate.

DESCRIPTION OF PREFERRED EMBODIMENTS

Figure 4:
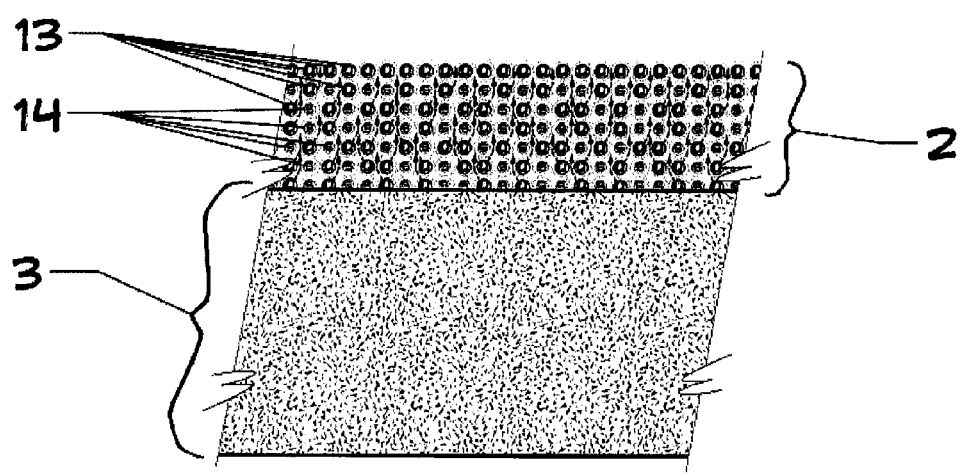
FIG. 4 demonstrates migration of the hydrophobic thermally migratable ultra-violet radiation absorber (HTMUVA) molecules from an interior to a surface of a coated substrate according to a concentration gradient

A surface decoration substrate of the present invention may have a multiple layer structure, and may be transparent or translucent at its outermost surface. The substrate should have an affinity for sublimation colorants, while being mechanically and chemically strong and stable.

FIG. 1 depicts an exemplary structure. A radiation resistant enhanced sublimation transfer object 1, an optional layer 3, with or without color, or which may be white, may be sandwiched between main body 4, which may be metallic, and top coating layer 2. In addition to metal, a combination of materials may be used for at least a portion of the base material. Examples of such materials include wood, ceramic, composite/plastic/polymer, compressed material, inorganic bulk or sheet materials. The optional layer 3 may function as an adhesion enhancement layer, and/or it may improve the mechanical or color quality of the image.

The preferred synthetic material used for the top coating layer 2 may comprise various thermoset polymers or composites having an affinity to sublimation colorants. They may be produced using various curing chemistries. Polyester resins such as hydroxyl-polyester, carboxylic-polyester, polyester urethane, epoxy-polyester hybrid, modified polyester and the like are the most preferred candidates, in the form of single functionality, copolymers, terpolymers or mixtures thereof. These polymeric materials may be used directly, or further cross-linked, or grafted through various curing mechanisms. The preferred resulting synthetic polymeric materials are polyester urethanes or polyester polyurethanes that provide the best compatibility with both sublimation colorants and hydrophobic thermally migratable ultra-violet radiation absorbers (HTMUVA) used for the present invention.

Various methods may be used to apply the polyester resin or polymer onto the main body 4 or main body with layer 3, either in a single coating step or in multiple steps. Common coating techniques, such as aqueous spray coating, knife coating, brush coating, transfer coating, liquid lamination, extrusion coating, dip coating, and/or powder coating may be used, depending on the specific substrate, curing chemistry, thickness and applications.

A preferred and advantageous method is powder coating. Resins with curing agents, cross-linkers, catalysts, additives, and/or colorants, etc. may be melted and mixed with extruders of various types. A well-blended mixture is pulverized into a desired particle size and size distribution before application to the prepared substrate surface using selected powder coating equipment. Corona charged powder spray, electrostatic spray, or a fluidized bed may be used to apply coating materials, with or without a charging agent, and followed by a curing process at elevated temperature.

Blocked isocyanates with various blocking agents may be used for curing the polyester resins in the powder coating. Toluene diisocyanate (TDI), methylenediphenyl diisocyanate (MDI), hexamethylene diisocyanate (HDI), polymethylene polyphenyl isocyanate (PAPI), isophorone disocyanate (IPDI), naphthalene diisocyanate (NDI) are among the common candidates. Blocking agents such as caprolactum, butanone oxime, methyl ethyl ketone oxime, phenol, trixene, or dimethylpyrazole may be used. The blocking/unblocking temperature of these blocked isocyanates is preferred to be at least 20-30 degrees higher than the extrusion or melt mixing temperature to prevent unnecessary reaction or decomposition. Preferably, $\epsilon$-caprolactum blocked isophorone disocyanate (IPDI), unblocks at about 170° C., and trixene blocked isophorone disocyanate (IPDI), which unblocks at about 120° C., may be used, depending on specific resin and curing equipment selections.

Emission free, internally blocked isocyanates based on IPDI uretdione chemistry may be used as cross-linkers for powder coating. The four-member uretdione ring may be cleaved upon exposure to its unblocking temperature yielding an active isocyanate group for curing purposes.

The hydrophobic thermally migratable ultra-violet radiation absorbers (HTMUVA) suitable for the present invention are selected mainly from the following groups of chemicals: benzophenone (BP), benzotriazole (BTZ), hydroxyphenyl-s-triazines (HPT), hindered amine light stabilizer (HALs), and oxalanilides. These radiation absorbers are capable of absorbing ultraviolet rays in the 290-450 nm wavelength range. To provide protection as preferred by the invention, the selected radiation absorbers should have a melting temperature lower than the heat transfer temperature, without decomposing or undergoing chemical reactions at heat transfer temperature and pressure. In order to properly thermally migrate, these hydrophobic thermally migratable ultraviolet radiation absorbers (HTMUVA) should also be substantially hydrophobic in functionality, having a molecular weight not exceeding 750 (non-coupling molecule), and being colorless or light colored in the visible color range. They are conjugated molecules with an affinity to the polymeric structure in use.

Examples of the hydrophobic thermally migratable ultraviolet radiation absorbers (HTMUVA) include, but are not limited to, 2,4-Dihydroxybenzophenone,4,4'-Dihydroxybenzophenone,2-(2-H-benzotriazole-2-yl)-4,6-bis(1-methyl-1phenylethyl)phenol (Tinuvin 900), benzenepropanoic acid, 3-)2-H-benzotriazole-2-yl)-5-(1,1-dimethylethyl)4-hydroxy-C7-C9 branched and linear esters (Tinuvin 99-2), 2-[2-hydroxy-4-[3-(2-ethylhexyl-1-oxy)-2-hydroxypropyloxy] phenyl]-4,6-bis(2,4-dimethylphenyl)-1,3,5-triazine (Tinuvin 405), 2-[4-[2-hydroxy-3-tridecyloxypropyl]oxy]-2-hydroxylphenyl]-4,6-bis(2,4-dimethylphenyl)-1,3,5-triazine/2-[4-[2-hydroxy-3-didecyloxypropyl]oxy]-2-hydroxylphenyl]-4,6-bis(2,4-dimethylphenyl)-1,3,5-triazine (Tinuvin 400), aminoether-substituted tetramethyl piperidine derivative (Tinuvin 123), Bis(1,2,2,6,6-pentamethyl-4-piperidinyl)-[(3,5-bis(1,1-dimethylethyl)-4-hydrophenyl]butylmalonate (Tinuvin 144 HALS), Tinuvin 1577. They may be used as a single component or in a mixture (such as Tinuvin B75), or in a modified form (such as Tinuvin 5333-DW).

The hydrophobic thermally migratable ultra-violet radiation absorbers (HTMUVA) selected for the present invention are capable of migrating inside the cured and finished polymeric material matrix, with the migration speed depending not only on temperature, but also on the concentration gradient, i.e. moving from high concentration areas to relatively lower concentration areas, often at the surface of the top coating where the radiation absorber molecules are exposed to the open environment and are therefore easily destroyed by various factors. According to Beer's law for light absorption, a thicker light absorption layer prevents higher light penetration in subsequent layers along the radiation path. This mechanism enables the maintenance of the hydrophobic thermally migratable ultra-violet radiation absorber (HTMUVA) supply at the surface of the coating, providing a long-lasting and continuous protection layer for the sublimation image. FIG. 4 depicts such a migration mechanism.

The usage level of the hydrophobic thermally migratable ultra-violet radiation absorber (HTMUVA) is generally dependent on the specific polymer system for the coating. An insufficient amount may not provide adequate or desired protection of the sublimation image from radiation, although it may be a sufficient amount for the polymer itself. However, too much of the absorber may drastically change the crystallinity or the glass phase transition temperature of the finished polymer matrix. Though low crystallinity, or low glass transition temperature, generally results in a high saturation level on the sublimation image, these factors may alter mechanical strength and scratch resistance, and may impact image sharpness. The ideal concentration of the hydrophobic thermally migratable ultra-violet radiation absorber (HTMUVA) at the imaged substrate should be higher than the sublimation colorant in terms of the number of molecules. Preferably, the usage level of in the coating layer 2 is from 0.5-10% of the total weight of the entire dry coating material, and most preferably in the range of 1-5%.

Other chemicals may also be used as coating additives to enhance the performance of the finished products, including reactive ingredient/co-reactants, chain extender, catalyst, moisture and/or free radical scavenger, flow agent, antioxidant, and/or color enhancement chemicals. In the case of tribo-charge electrostatic coating applications, tribo-charging agents may be used. UV blocking agents, especially nanoparticles of ZnO and/or SiO2, may also be compounded into the coating formulation. These transparent/translucent nanoparticles not only block ultraviolet radiation, but may also help to stabilize the mechanical or physical properties of the finished coating material.

The thickness of the sublimation topcoat layer 2 may be between 5-300 microns but preferably between 20-75 microns.

TABLE I

General Powder Coating Composition of Top Coating Layer 2

| Ingredient | dry weight % |
| --- | --- |
| Polyester resin | 50-95 |
| Curing agent | 0-25 |
| HTMUVA | 1-10 |
| Other Additives | 0-15% |

In sublimation imaging, including digital sublimation printing, transfer printing has unique advantages. An intermediate transfer media, or transfer media, often paper or plastic, is used for receiving the image from the printer and temporarily carrying the printed image until the image is transferred from the transfer media to a final substrate. The final substrate may be in various sizes and shapes, or even in three-dimensional shapes. An imaged side of the transfer media is placed in close contact with an object comprising a synthetic polymer material and having affinity for sublimation colorants. Pressure may be applied by a mechanical press (or the like) to ensure appropriate intimate contact and minimum distance between the two surfaces, and heat is applied to the non-imaged side of the transfer media. The printed image, comprising ingredients or chemicals including sublimation colorants, sublimates and/or thermally migrates and bonds to the final substrate, achieving a color-fast image on the substrate. Sublimation colorants or thermally migratable ingredients may penetrate into the substrate polymeric matrix from several microns to over a hundred microns in depth, preventing the image from being directly exposed to mechanical or chemical damage.

One embodiment of the invention uses a hydrophobic thermally migratable ultra-violet radiation absorber (HTMUVA) to condition a transfer media for further improvement of radiation resistance of the final substrate. Two of the approaches that may be employed for conditioning of the transfer media are: 1) introducing hydrophobic thermally migratable ultra-violet radiation absorber (HTMUVA) onto the transfer media having no pattern or imaging; and 2) introducing hydrophobic thermally migratable ultra-violet radiation absorber (HTMUVA) via printing inks through the generation of specific patterns of images. In either approach, an extra amount of radiation absorber, especially at the top surface of the coating layer 2 of the final substrate, is preferred to be added to enhance the radiation resistance performance.

Hydrophobic thermally migratable ultra-violet radiation absorbers (HTMUVA) may be formulated into the transfer media or transfer paper coating composition, as an extra ingredient, and preferably evenly applied through the entire surface at least one side of the media (FIG. 2). An alternative method is to formulate the radiation absorber independently, and then coat the material onto a transfer media after the manufacturing process. In the latter case, coating with a decal to generate a latent pattern or image may also be employed. Sublimation inks can then be delivered, with the inks covering at least a portion of the radiation absorber conditioned area before they are heat transferred.

The conditioning of transfer media by hydrophobic thermally migratable ultra-violet radiation absorber (HTMUVA) is performed without substantially altering the properties of the transfer media, especially the ink receiving and drying capability, and/or the heat transfer efficiency.

Various compounding or coating techniques may be adopted to accomplish transfer media conditioning using hydrophobic thermally migratable ultra-violet radiation absorbers (HTMUVA), including methods known in the art. Aqueous coating methods are preferred in most cases due to their operational safety and low environmental impact. The hydrophobic thermally migratable ultra-violet radiation absorber (HTMUVA) chemicals may be dispersed alone or with other coating ingredients through pulverization and stabilization, or introduced without going through pulverization. Hydrophilic encapsulated or microencapsulated hydrophobic thermally migratable ultra-violet radiation absorber (HTMUVA) may be directly used as an additive in aqueous formulations. For a multiple-layered transfer media or transfer paper coating formulation, it is important that the radiation absorber ingredients are in proximity to, or directly underneath, the ink receiving layer 6 (FIG. 2).

Alternatively, the hydrophobic thermally migratable ultra-violet radiation absorber (HTMUVA) may be formulated into printing inks such as inkjet printing inks, and applied, either simultaneously or independently, only where sublimation colorant is present on the transfer media. In this embodiment, the specific radiation absorber, selected from the groups given in the previous sections, can be pulverized (sometimes milled) into sublimation inks as a colorless ingredient in a liquid carrier. The similar hydrophobic nature between sublimation colorants and the hydrophobic thermally migratable ultra-violet radiation absorber (HTMUVA) allows these two groups of molecules to co-exist as a dispersion or suspension.

Another method uses a hydrophilically encapsulated or microencapsulated hydrophobic thermally migratable ultra-violet radiation absorber (HTMUVA) as a colorless component. This results in separate, but well mixed, particles of the radiation absorber in an aqueous sublimation ink.

The ink particle size formed by the radiation absorber, with or without sublimation colorants, is controlled and screened from a nanometer scale to a micron scale, with the particles preferably between 0.01 to 0.25 microns for proper particle distribution, stability and printability.

Examples of encapsulated hydrophobic thermally migratable ultra-violet radiation absorbers (HTMUVA) include those produced through novel encapsulated additive technology (NEAT) under the trade name of Tinuvin DW such as Tinuvin 99DW, Tinuvin 400DW, Tinuvin 477DW, Tinuvin 5333DW, and CGL339. These tiny, core/shell structured nanoparticles with particle diameters are generally less than 100 nanometers, with the hydrophobic radiation absorber molecule aggregates in the core and polymeric shell surrounding the core. Hydrophilic polymeric functional chains stretching from the polymer shell assist proper suspension and stability of the particles in aqueous carriers. After discharging the liquid carrier through evaporation on the transfer media (layer 6), these tiny particles release the core contents at the heat transfer temperature, allowing migration and transfer of the radiation absorber into the final image substrate layer 2.

Conditioning inks comprising hydrophobic thermally migratable ultra-violet radiation absorber (HTMUVA), but without sublimation colorants, may be used independently. Such inks may be printed onto the transfer media, either prior to or after imaging of the sublimation colorant, overlapping at least a portion of the sublimation image, or covering the entire area of the transfer media, before heat transfer. The conditioned transfer media without sublimation colorant may be used to protect a pre-made sublimation image applied to the transfer substrate, or used to protect the non-imaged areas. Table II demonstrates a typical ink composition, including an inkjet ink composition.

TABLE II

Typical Conditioning Ink Composition of Present Invention

| Ingredient | weight % |
|---|---|
| Sublimation colorants | 0-10 |
| HTMUVA | 0.05-15 |
| Additives | 0-15 |
| Liquid carrier | balance |

The use of an HTMUVA coated substrate with a conditioned transfer media offers extra UV radiation protection by providing a higher surface HUMUVA concentration at the transfer substrate. Also, the conditioned transfer media may independently provide protection to final substrates not prepared according to the primary teaching of the invention, and/or to substrates without UV radiation protection treatment. Textiles/fabrics, coated wood, metals, composites/plastics, hardboard, fiberglass reinforced plastic (FRP), medium-density fiberboard (MDF) and high-density fiberboard (HDF), glass, and stoneware, etc. are substrates that may be equipped to provide suitable radiation protection of sublimation images, and/or non-sublimation images, according to the teachings of the present invention.

In inkjet printing, a computer generated or manipulated color image is converted to a digital data stream. The data stream is transferred to a digital printer, where at least one color channel is used. Small ink droplets are discharged as directed by the digital data, reproducing at least a portion of the original image (sometimes latent) onto a printing media or transfer media. Multiple color channels may be used to create multiple color images, which may be transferred to another substrate by transfer imaging or printing. Usually, heat or other energy forms are used to accomplish transfer printing and to ensure proper curing or fixation.

What is claimed:

1. A method of forming a substrate having enhanced protection against ultraviolet light, comprising the steps of:
    a) preparing an ink comprising a thermally migratable ultraviolet radiation absorber;
    b) digitally printing the ink comprising a hydrophobic thermally migratable ultraviolet radiation absorber on a transfer media;
    c) thermally transferring the hydrophobic thermally migratable ultraviolet radiation absorber from the transfer media to a surface of a final substrate;
    wherein the hydrophobic thermally migratable ultraviolet radiation absorber provides ultraviolet radiation protection on the final substrate.

2. The method of forming a substrate having enhanced protection against ultraviolet light as described in claim 1, wherein the ink further comprises a sublimable colorant, and wherein the sublimable colorant is sublimed and transferred to the final substrate with the hydrophobic thermally migratable ultraviolet radiation absorber.

3. The method of forming a substrate having enhanced protection against ultraviolet light as described in claim 1, wherein the ink is printed on the transfer medium to overlap at least a portion of an image applied to the transfer medium.

4. The method of forming a substrate having enhanced protection against ultraviolet light as described in claim 1, wherein the hydrophobic thermally migratable ultraviolet radiation absorber is encapsulated.

5. The method of forming a substrate having enhanced protection against ultraviolet light as described in claim 1, wherein the hydrophobic thermally migratable ultraviolet radiation absorber comprises 0.05-15% of the total weight of the ink.

6. The method of forming a substrate having enhanced protection against ultraviolet light as described in claim 1, wherein the step of digitally printing the ink comprising hydrophobic thermally migratable ultraviolet radiation absorber is by an ink jet printer.

7. The method of forming a substrate having enhanced protection against ultraviolet light as described in claim 1, wherein the final substrate is a metallic substrate.

8. The method of forming a substrate having enhanced protection against ultraviolet light as described in claim 1, wherein the final substrate comprises a polymer.

9. The method of forming a substrate having enhanced protection against ultraviolet light as described in claim 1, wherein the final substrate comprises a polymer, and wherein the hydrophobic thermally migratable ultraviolet radiation absorber has an affinity for the polymer.

10. The method of forming a substrate having enhanced protection against ultraviolet light as described in claim 1, wherein the final substrate comprises an image, and wherein the hydrophobic thermally migratable ultraviolet radiation absorber migrates through the image.

11. The method of forming a substrate having enhanced protection against ultraviolet light as described in claim 1, wherein the final substrate comprises a polymer, and wherein the hydrophobic thermally migratable ultraviolet radiation absorber migrates through an image that is formed on the final substrate.

12. The method of forming a substrate having enhanced protection against ultraviolet light as described in claim 1, wherein the ink is a liquid ink.

\* \* \* \* \*